United States Patent [19]

Jarecki

[11] Patent Number: 5,435,521
[45] Date of Patent: Jul. 25, 1995

[54] BALL VALVE WITH RINSING ACTION

[76] Inventor: Frank E. Jarecki, 5650 Culpepper Dr., Erie, Pa. 16506

[21] Appl. No.: 255,747

[22] Filed: Jun. 7, 1994

[51] Int. Cl.$^6$ ............................................. F16K 5/06
[52] U.S. Cl. ........................ 251/315.16; 251/315.13; 137/238
[58] Field of Search ................ 251/315 BC; 137/238, 137/240, 242

[56] References Cited

U.S. PATENT DOCUMENTS

| | | | |
|---|---|---|---|
| 1,616,386 | 2/1927 | O'Stroske | 251/315 BC X |
| 3,460,802 | 8/1969 | Colby et al. | 251/315 BC X |
| 3,883,113 | 5/1975 | Kolb | 251/315 BC X |
| 4,418,887 | 12/1983 | Tubaro | 251/315 BC X |
| 4,542,878 | 9/1985 | Kulisek | 251/315 |

*Primary Examiner*—John C. Fox
*Attorney, Agent, or Firm*—Lovercheck and Lovercheck

[57] ABSTRACT

A ball valve having a body with an inlet, an outlet and a cavity containing a ball with a spherical flow passage between the inlet and the outlet. A ring supported on the body concentric to the inlet and the outlet. A seat surface is supported on the ring between an outer transition surface, an inner transition surface and concentric to the inlet. The seat surface is engaged by the ball member. The inner transition surface and the outer transition surface are each inclined to the seat surface at a shallow angle. A flow passage extends through the spherical surface of the ball at a sharp edge that moves across the transition surface adjacent the seat surface to the seat surface as the ball moves from an open to a closed position. The sides of the ball each have a recess extending through the spherical surface at a sharp edge whereby a cleaning action on the seat results during opening and closing of the spherical surface.

4 Claims, 3 Drawing Sheets

BALL VALVE WITH RINSING ACTION

BACKGROUND OF THE INVENTION

Applicant is aware of U.S. Pat. No. 4,542,878 to Kulisek for a ball valve showing a portion of the ball removed and a dome-like projection on the end. Applicant is also aware of German Patent No. 2,710,519 for a rotatable plug valve showing the ball having sides flattened. None of these prior art patents show a ball valve wherein the ball has:

(1) concave sides with the concave sides terminating at their periphery in sharp edges;
(2) a flow passage passing through the spherical surface of the ball at sharp edges and;
(3) the valve body has a seat with an inner transition surface, an outer transition surface, and a seat surface on the flow passage through the ball and is disposed at a shallow angle to the seat surface around the flow passage.

The seat area is not affected by the edges of the concave recess, the edges around the flow passage through the ball will perform a shearing, scissor-like action for cleaning the ball. Therefore, combining the edges of the spherical concave ball face and the flowport edges the entire seat area benefits from the scissor-like cleaning effect.

SUMMARY OF THE INVENTION

It is an object of the present invention to provide an improved ball valve.

Another object of the present invention is to provide a ball valve in which the outer face of the ball will be out of contact with the valve seats during the cycling phase of the valve operation as the ball is rotated from open to close or from close to open positions. The purpose of the valve structure is to prevent the otherwise wiping area of the ball, which would normally be exposed to solids in the inlet passage to be roughened by corrosive pitting or by scale deposits, from damaging the seats.

Another object of the invention is to provide a ball valve having a flow passage that passes through the spherical surface of the ball at a sharp edge.

Another object of the present invention is to provide a ball valve wherein the part of the spherical surface of the outer surface of the ball that is exposed to the inlet passage when the ball is in the closed position is removed. This is so that all parts of the spherical surface of the ball that has been exposed to the inlet passage of the valve while the ball is in the closed position will be out of contact with the seating surface while the ball is rotated from an open to a closed position.

Another object of the present invention is to provide a ball valve wherein the edges of the ball around its flow passages and around its concave sides are sharp.

Another object of the invention is to provide a ball valve that is simple in construction, economical to manufacture, and simple and efficient to use.

Another object of the present invention is to provide a ball valve wherein the relieved outer face of the ball which is spherically concaved, provides a flow path between the relieved area and the valve seats and provides a means of flushing the body cavity during cycling of the valve, thus preventing sediment entrapment in the body cavity between ball and seats.

Another object of the present invention is to provide a ball valve wherein the edges resulting from the formation of the relieved spherical concave ball faces and the spherical ball surface are relatively sharp so as to provide a shearing, scissor-like action as the edges wipe across the valve seat for the purpose of cleaning the seats.

Another object of the present invention is to provide a seat configuration compatible with the relatively sharp edges of the spherical concave ball face and the edges of the flow passage. Without this consideration, the mentioned edges could interfere with the edges of the seat where the ball edges and seat edges contact. The seat therefore is configured with shallow approach angles located at the O.D. of the seat edge and I.D. of the seat edge. The purpose of the approach angles is to avoid any possible interference during ball rotation as ball edge contact is made with the seat.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENTS

Figure 1:
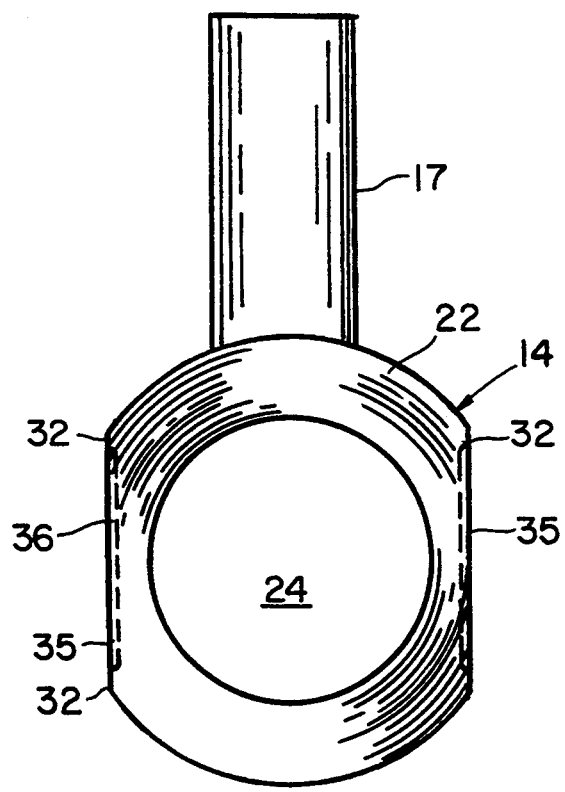
FIG. 1 is an inlet side view of a ball member used in the valve according to the invention.

Now with more particular reference to the embodiment of the invention shown in FIGS. 1 through 9, valve 10 has valve body 12 and spherical ball member 14. Valve body 12 has cylindrical inlet passage 16, cylindrical outlet passage 18 and cavity 20. Cavity 20 is located between inlet passage 16 and outlet passage 18.

Figure 2:
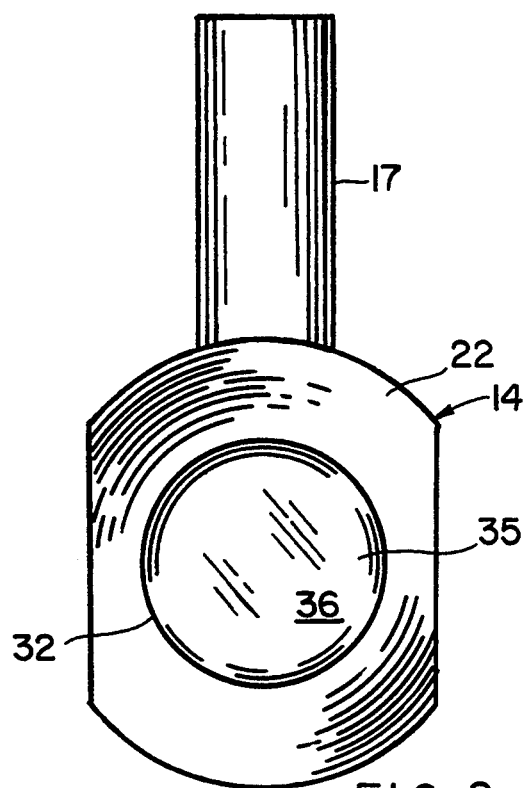
FIG. 2 is a closed side view of the ball valve member shown in FIG. 1.
Figure 3:
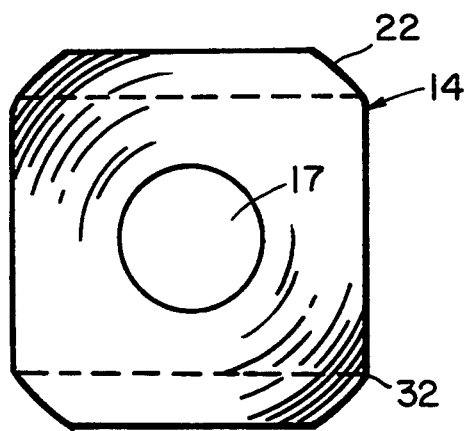
FIG. 3 is a top view of the ball shown in FIG. 1.
Figure 4:
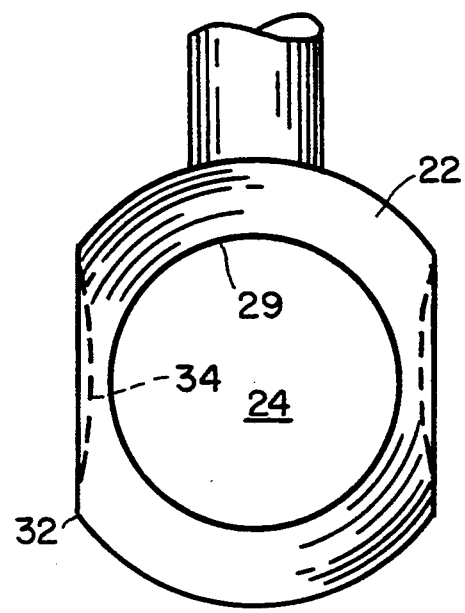
FIG. 4 is an outlet side view of the ball valve member shown in FIGS. 1 through 4.
Figure 5:
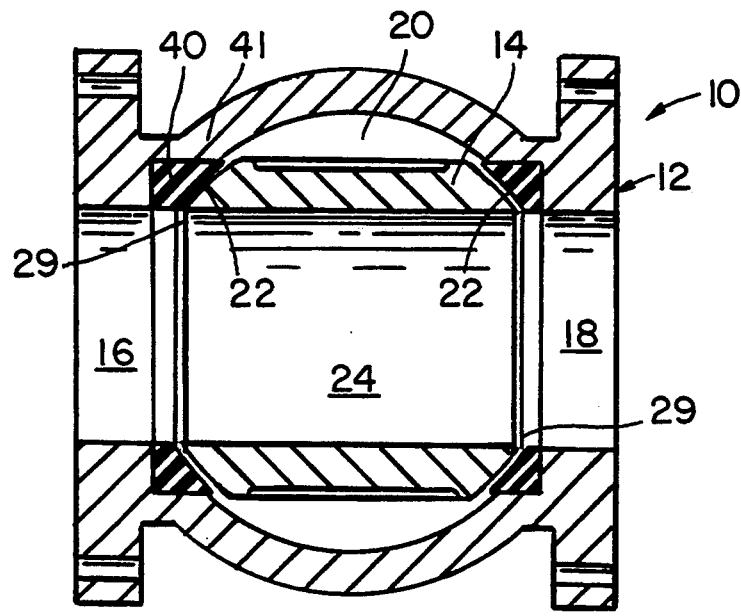
FIG. 5 is a longitudinal cross sectional view showing the valve in a full open position.
Figure 6:
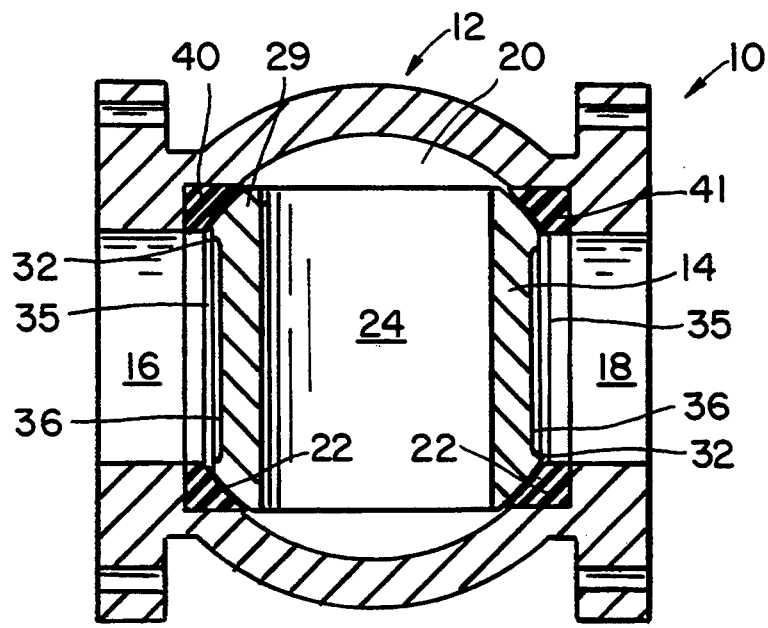
FIG. 6 is a view similar to FIG. 5, showing the valve in a fully closed position.

Spherical ball member 14 has stem 17, which may be considered means for rotating ball member 14 from an open position shown in FIG. 2, to a closed position as shown in FIG. 6. Stem 17 is shown fixed to the top of ball member 14 for rotating ball member 14 in valve body 12. Stem 17 may be separately attached. Ball member 14 has cylindrical flow passage 24 which extends through spherical outside surface 12. Flow passage 24 meets outside surface 22 at relatively sharp edge 29. Sharp edge 29 on ball member 14 is circular and has a diameter substantially equal to the diameter of flow passage 24.

Figure 9:
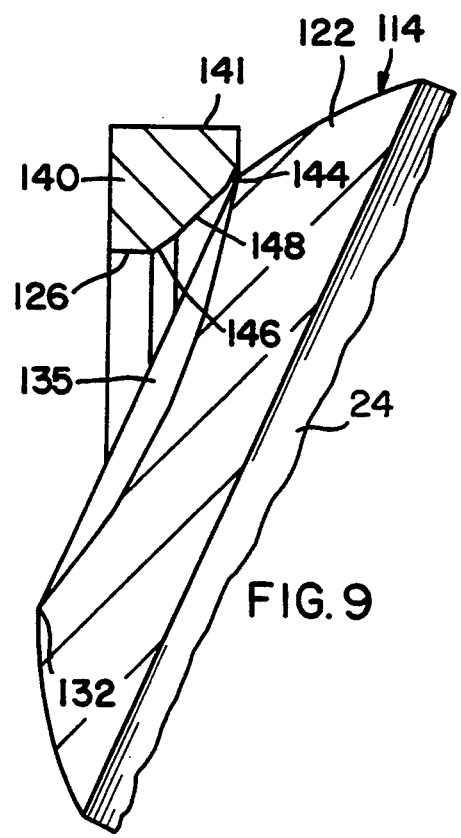
FIG. 9 is an enlarged partial cross sectional view of another embodiment of the valve seat member and the ball member.

The sides of ball member 14 each have concave recess 35 that extends through spherical outside surface 22 at circular sharp edge 32. Each recess 35 has a diameter equal to the diameter of sharp edge 32. Bottom 36 of each recess 35 may be configured in various geometric shapes including relatively flat as shown in the embodiment of FIGS. 5, 6, 7 and 8. Since bottom 36 is spaced from outside surface 22, corrosion and foreign material that may deposit on bottom 36 when ball member 14 is in a closed position, as shown in FIG. 8, will be spaced from seat ring 40 as ball member 14 is rotated. Now with more particular refernece to the embodiment of the invention in FIG. 9, shown is seat ring 140 and ball 114.

Seat rings 140 are received in grooves 141. Grooves 141 are formed in valve body 12 concentric to inlet passage 16 and equal to outlet passage 18. Seat rings 140 may have a cylindrical outer periphery of a diameter about equal to the outer diameter of grooves 141. Seat rings 140 each have bore 126 about equal to the diameter of inlet passage 16 and the diameter of outlet passage 18. Seat rings 140 have annular outer transition surface 144, inner transition surface 146 and annular spherical seating surface 148 between outer transition surface 144 and inner transition surface 146.

Figure 7:
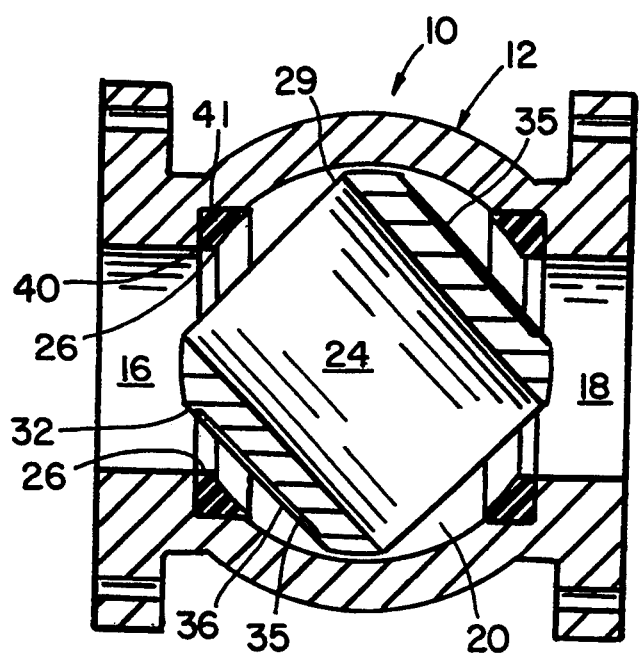
FIG. 7 is a longitudinal cross sectional view showing the relation of the spherical ball member to the seat members with the ball in a half open position.
Figure 8:
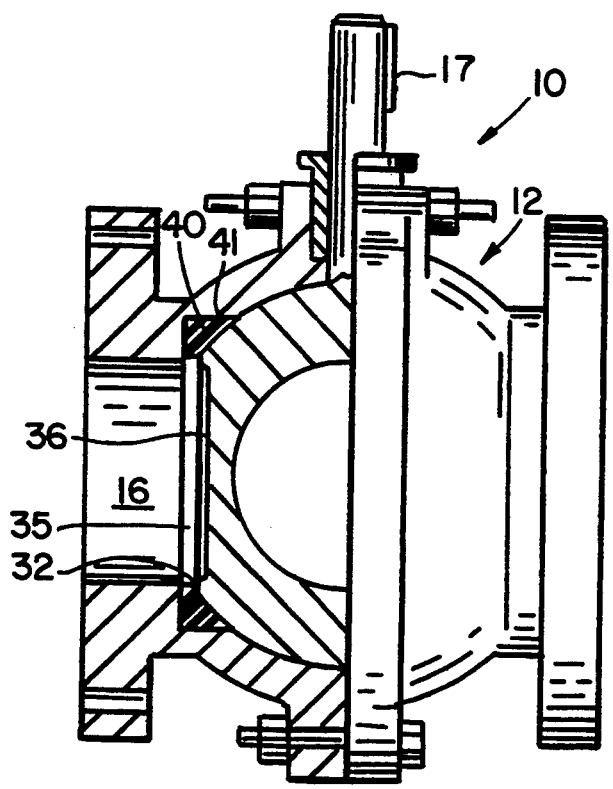
FIG. 8 is a half cross sectional view similar to FIG. 6 showing a valve according to the invention with a typical body construction.

As ball member 114 is rotated from an open position to a closed position, as shown in FIG. 7, sharp edge 29 first swings past outer transition surface 144 and sharp edge 29 then engages seating surface 148. Inner transition surface 146 and outer transition surface 144 are disposed at a shallow angle to seating surface 148. Outside surface 122 of ball member 114 will be out of contact with seating surface 148 until outside surface 22 has crossed outer transition surface 144 during the cycling phase of the valve operation as ball member 114 is rotated from open to close or from close to open positions. The purpose of recess 135 is to prevent contamination of the other wiping area of ball member 114, which would normally be exposed to material in inlet passage 16 toughened by corrosive pitting or by scale deposits from damaging seating surface 148. Recess 144 of ball member 114, being concave, provides a flow path between recess 144 and seating surface 148 to provide a means of flushing cavity 20 during cycling, thus preventing sediment entrapment in cavity 20 between ball member 114 and seating surface 148.

When the ball is in a closed position, recess 135 is exposed to foreign material, such as scale or corrosive pitting of the surface itself or film deposits, over flat portion 148, which may occur during use. Such material will accumulate in recessed surfaces of cavity 135, thus preventing seat damage or ordinary turning torque which would otherwise be caused by interference of the working surfaces of ball member 114 and seating surface 48 of rings 140.

Recesses 135 are formed in each side of ball member 114. Recesses 135 extend through outside surface 122 and join outside surface 122 at sharp edge 139. Recesses 135 have spherical bottom instead of a flat bottom, as in the embodiment of the invention shown in FIGS. 1 through 8.

Ring 140 is received in grooves 141 in body 112. Ring 140 has outer transition surface 144, inner transition surface 46 and intermediate transition surface 42.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A ball valve comprising a valve body;
   said valve body having a cylindrical inlet passage;
   a ball receiving cavity connected to said inlet passage;
   a ball member in said cavity;
   said ball member having a cylindrical flow passage therethrough;
   said ball member having a spherical outer surface;
   said ball member having a recess in at least one side;
   said recess being spaced from said cylindrical flow passage through said body providing a path for flow around said ball member when said ball member is in a partially opened position for flushing said cavity between said valve body and said ball member during cycling from open to closed positions to keep said cavity clear of entrained matter;
   said recess terminatinq at a relatively sharp edge;
   sealing means on said valve body surrounding said flow passage at each side of said cavity;
   said sealing means comprise seat rings each set in a groove in said valve body concentric with said cylindrical flow passage;
   said seat rings each having a sealing surface engaging said spherical outside surface of said ball;
   said seat rings have an outer transition surface and an inner transition surface;
   said sealing surface disposed between said outer transition surface and said inner transition surface;
   said outer transition surface joining said sealing surface and extending radially outwardly therefrom at a shallow angle to said seating surface;
   said inner transition surface joining said sealing surface and extending radially inwardly therefrom at a shallow angle to said seating surface whereby upon rotation of said ball member from open to closed position or from closed to open position;
   any possible interference is avoided between said seating surface and the sharp edge and thus said sharp edge of said bali provides a shearing, scissor-like action as it wipes across said sealing surface for cleaning said surfaces.

2. The ball valve recited in claim 1 wherein a second recess is provided on a side opposite said first recess area.

3. The ball valve recited in claim 1 wherein said recess generally comprises a spherical surface extending into said ball member.

4. The ball valve recited in claim 3 wherein said recess have generally flat bottom surfaces and generally flat side surfaces.

* * * * *